Aug. 8, 1967  A. S. EL-NAGGAR  3,335,081
METHOD OF TREATMENT OF SEWAGE BY BIO-OXIDATION
AND APPARATUS THEREFOR
Filed Feb. 2, 1966  2 Sheets-Sheet 2
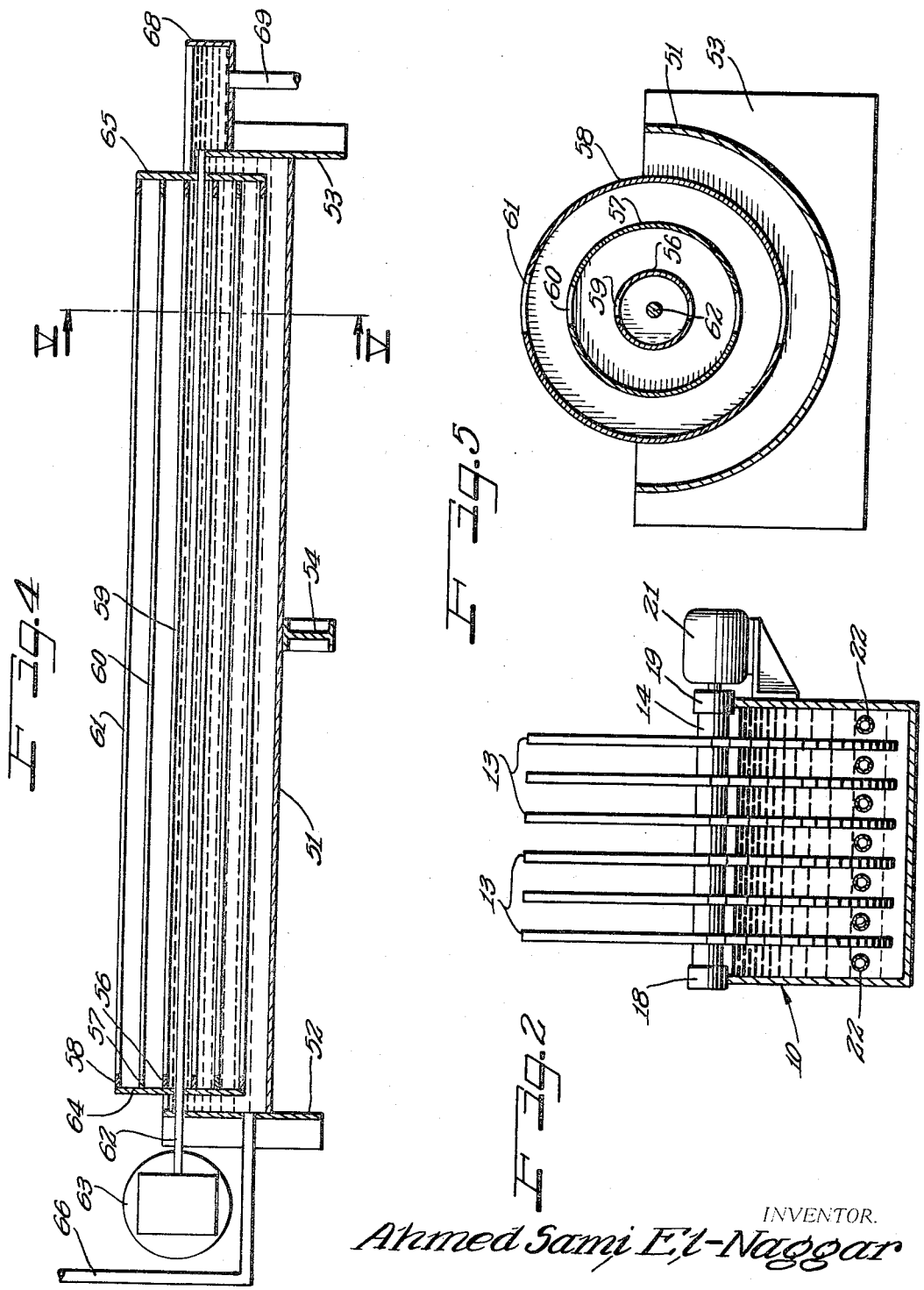
INVENTOR.
Ahmed Sami El-Naggar
BY  ATTORNEYS

United States Patent Office 3,335,081
Patented Aug. 8, 1967

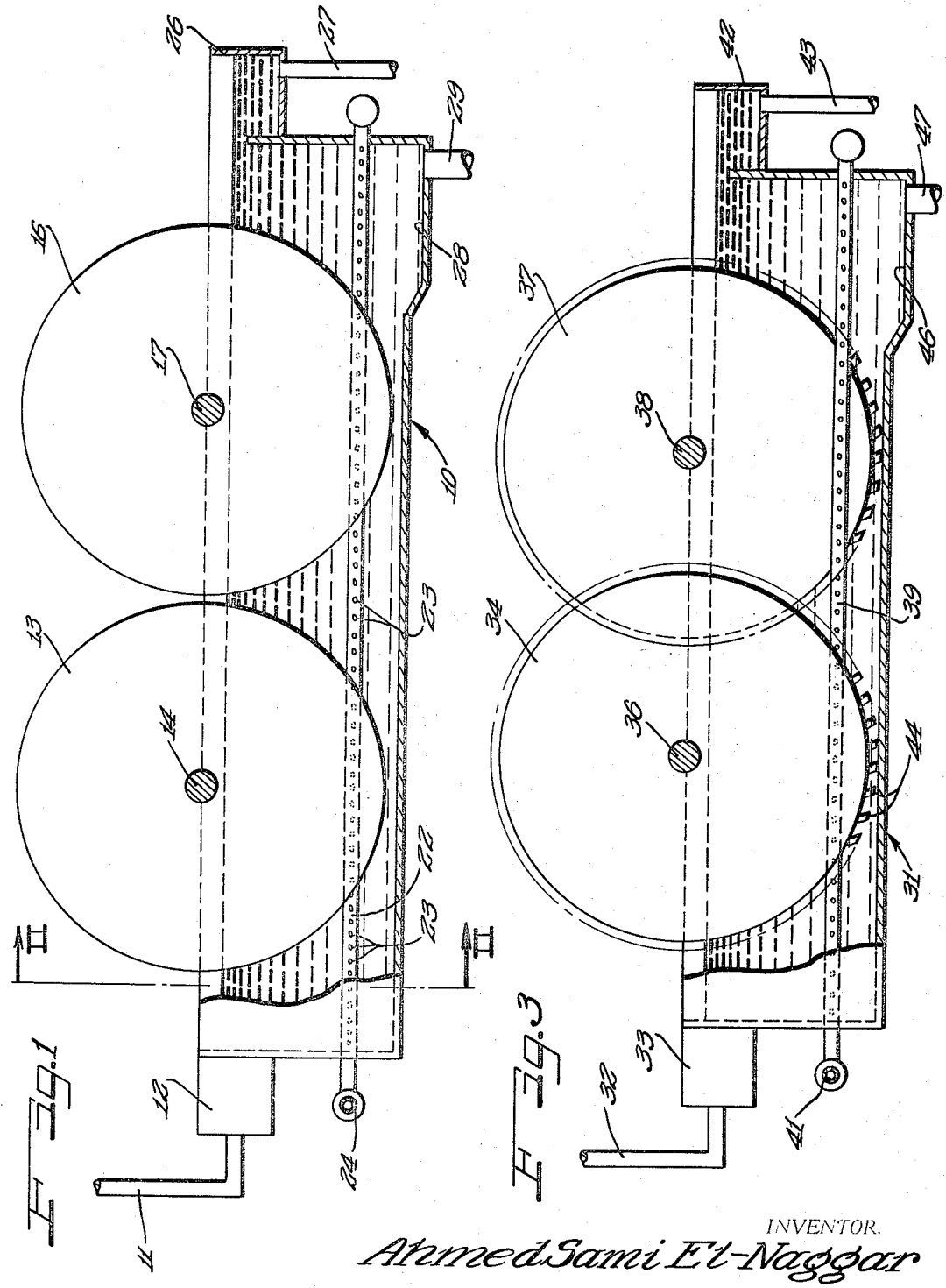

3,335,081
METHOD OF TREATMENT OF SEWAGE BY BIO-OXIDATION AND APPARATUS THEREFOR
Ahmed Sami El-Naggar, 6 Mayfield Ave.,
Valparaiso, Ind. 46383
Filed Feb. 2, 1966, Ser. No. 524,403
4 Claims. (Cl. 210—15)

The present invention relates to a method and apparatus for sewage treatment.

Generally, sewage is treated first with a primary sedimentation, followed by some type of oxidation process. The most frequently used oxidation processes are filtration by filters of various description, aeration by the activated sludge process, or by contact aerators, or by oxidation ponds. All of these procedures depend upon bringing organic matter in suspension or solution in sewage into intimate contact with a colony of microorganisms living under aerobic conditions.

One of the most common and most economical secondary sewage treatment processes employs a trickling filter which is a fixed bed system utilizing beds of rock, gravel, blast furnace slag, coal, or other inert materials. The settled sewage is sprayed over the filter media beds, and the microorganisms present form a slime layer on the media surface. The water passes down over the surface in a thin film, whereupon nutrients from the sewage are adsorbed in the slime layer and absorbed as food by the organisms.

A typical trickling filter consists of a filter tank, the filter media itself, an underdrain system, and a distribution mechanism. The filter tank is built to house the media and the underdrains, and to support the distribution system. The most widely used type is a reinforced concrete tank which may be circular or rectangular. In small installations, the unit is usually a circular steel tank.

The bed of media usually consists of particulate material ranging in diameter from 2½ to 4½ inches. The media chosen should be durable, insoluble in sewage, free from organic materials, and resistant to freezing and thawing.

The underdrain system carries the sewage and the sloughed slime and solids as it reaches the bottom of the tank, to the subsequent unit and provides ventilation for the maintenance of aerobic conditions. The underdrain system is usually built from precast concrete or vitrified clay blocks.

The sewage is generally applied to the media bed by means of rotating arms which apply the sewage as a thin sheet to the bed with short intervals between applications. Some plants still, however, use the older type of fixed spray nozzle to accomplish the same objective. In connection with a properly operated sedimentation tank, a trickling filter can reduce the biochemical oxygen demand (BOD) by a factor of 85 to 90%.

While conventional trickling filters provide a reliable operating device, there are still some operational disadvantages which limit the usefulness of this type of system and increase the operational difficulties. One of the outstanding disadvantages is the head loss which occurs through the filter, such loss varying between about 5 to 11 feet of water in typical installations. Furthermore, the trickling filter type system represents a relatively high cost assembly from the standpoint of initial investment.

The trickling filter system has the further difficulty of clogging of the distributor means whether fixed nozzles or rotating arms, as well as damage due to solid accumulation in such distributors. Furthermore, the coagulated solids resulting from the passage of the sewage over the media together with the sloughed off filter slime accumulate at the bottom of the system where they can cause clogging of filter blocks.

One other difficulty arises due to the fact that during winter months, careful attention must be paid to prevent freezing, particularly with low rate filters. Another problem arises from excessive film growth at the surface together with weed growth and accumulation of leaves which can cause surface ponding, thus stopping the flow. Ponding can also be caused by using too small sized media or through the use of a poor quality stone which results in chipping and breakage.

Another disadvantage is the non-uniformity which is characteristic of rotary distributors, in particular, requiring periodic adjustment and maintenance during different seasons of the year. Still another problem results from the breeding of filter flies, particularly in low rate filters where ponding occurs. Lastly, there is the ever present problem of odor, particularly in hot summer months due to the presence of anaerobic conditions in the filter bed which may result from inadequate ventilation or clogging.

With the foregoing as a background, it will be seen that typical trickling filter installations, while they can be reasonably efficient in the bio-oxidation of sewage, have many objectionable features incident to their operation. The elimination of many of these objectional features is the principal object of the present invention.

Another object of the invention is to provide an improved biological reactor for the treatment of sewage and the like which does not require an elaborate distribution system or an underdrain system.

Another object of the invention is to provide a bio-oxidative system for the treatment of waste products which can be fed continuously rather than intermittently.

Another object of the invention is to provide a waste treatment system in which there is no significant loss of pressure head, and no problems of ponding or clogging.

Another object of the invention is to provide an improved method of waste material treatment which substantially minimizes the odor present.

A still further object of the invention is to provide a method for treatment of waste products such as sewage and the like which eliminates the possibility of unequal distribution of sewage over the treating media where the organisms are functioning.

In accordance with the present invention, I provide a biological reactor which includes a channel type trough wherein the aqueous material is continuously fed as a stream. The treating media consists of rotatable means disposed in the trough in the path of flow of the waste material passing therethrough, the rotatable means being partly immersed in the stream and partly exposed to the ambient atmosphere to provide the aerobic conditions necessary for the bio-oxidation of the waste material.

A further description of the present invention will be made in conjunction with the attached sheets of drawings which illustrate several preferred embodiments.

In the drawings:

FIGURE 1 is a somewhat schematic view in elevation and partly in cross-section of the biological reactor constructed according to the present invention;

FIGURE 2 is a cross-sectional view taken substantially along the line II—II of FIGURE 1;

FIGURE 3 is a view similar to FIGURE 1, but illustrating a somewhat modified form of the invention;

FIGURE 4 is a somewhat schematic view partly in elevation and partly in cross-section illustrating a further modified form of the invention; and FIGURE 5 is a cross-sectional view taken substantially along the line V—V of FIGURE 4.

As shown in the drawings:

In FIGURE 1, reference numeral 10 indicates generally an elongated trough through which the waste materials are continuously moved. Preceding this treatment, the waste materials would normally have first been treated in a primary settling tank where the larger pieces of foreign matter would be settled out. The influent flows by gravity through an inlet conduit 11 into an influent collection box 12 at one end of the trough 10. The stream of waste material in passing through the trough 10 comes into contact with media consisting of a series of disks 13 mounted in spaced relation along a shaft 14, and a second series of disks 16 also mounted in spaced relation along a shaft 17. As shown in FIGURE 2, the shaft 14 may be supported between spaced bearings 18 and 19 and driven by a motor 21. As seen in FIGURES 1 and 2, approximately ½ of the areas of the disks 13 are submerged below the level of liquid in the tank 10, while the remaining half or so is exposed to air to maintain aerobic conditions. The disks 13 and 16 can be composed of any suitable inert material on which the microorganisms can flourish and provide a suitable environment for the bio-oxidative reaction which occurs. The material should be durable, insoluble in sewage, free from organic matter, and resistant to freezing and thawing. Typically, the disks 13 and 16 may be composed of plastic sheets, foamed plastics or other appropriate synthetic materials.

As the waste material flows through the trough 10, it comes into contact with the rotating disks 13 and 16 whereupon the microorganisms present on the disks form a slime layer on the surface which adsorbs nutrients from the sewage and effect their removal from the stream. By providing a sufficient number of disks 13 and 16, a substantial treatment area can be provided without introducing a substantial resistance to flow of the liquid through the trough 10. The disks, of course, are constantly being maintained in aerobic condition by continual explosion of a portion of their surfaces to the ambient atmosphere.

Additional aeration can be provided, if required, by positioning a plurality of aeration tubes 22 between the various disks as shown in FIGURES 1 and 2. The tubes 22 may consist of a plastic or other inert material having apertures 23 therein providing for the bubbling of air through the stream of aqueous material. The tubes 22 may be connected to a header 24 which is fed from a suitable source of compressed air (not shown).

The effluent of the unit is constantly withdrawn into an effluent collection box 26 which feeds a discharge conduit 27 communicating with a final settling tank or the like, or the effluent can be recirculated back into the influent conduit 11 for retreatment. The effluent of the unit will contain coagulated solids with some sloughed slime. This effluent, after suitable settling, can then be disposed of after chlorination.

Solids settling out of the stream and additional amounts of material sloughed off from the disks 13 and 16 can be collected in a sump 28 formed at the base of the trough 10, and periodically or continuously discharged through a discharge conduit 29.

A somewhat modified form of the invention is illustrated in FIGURE 3 of the drawings. In the form of the invention there illustrated, I provide a trough 31 which is continuously fed with the sewage to be treated through an influent pipe 32 and an influent collection box 33 communicating with the interior of the trough 31. A plurality of media disks 34 is supported for rotation on a shaft 36, and a second plurality of disks 37 is similarly supported for rotation on a shaft 38. The spatial arrangement of the disks 34 and 37 is such that they are in interleaved relationship, with the peripheries of the disks overlapping to some extent. Additional aeration is provided by a plurality of perforated aerating pipes 39 fed with air from a header 41. The supernatant liquid is continuously discharged into an effluent collection box 42 for discharge into an effluent line 43 feeding a settling tank from which the clarified water is disposed of after chlorination. In the form of the invention illustrated in FIGURE 3, the peripheries of the disks 34 and 37 may also be provided with circumferentially spaced scraper blades 44 to move any settled solids from the bottom of the tank to a sump 46 from which they can be periodically or continuously removed through a drain 47. It will be understood, of course, that similar scraper blades can be employed with the disk arrangement shown in FIGURES 1 and 2.

In the form of the invention illustrated in FIGURES 4 and 5 of the drawings, the media takes the form of perforated rotating concentric cylinders. The treating tank consists of a semicircular trough 51 secured between a pair of end plates 52 and 53. Additional support may be provided by the inclusion of an I beam 54 centrally of the trough. The particular form of the invention illustrated in FIGURES 4 and 5 makes use of three concentric cylinders 56, 57 and 58 respectively, each of the cylinders being provided with two opposed, longitudinally extending slots which have been identified at reference numerals 59, 60 and 61 on the cylinders 56 through 58, inclusive. The purpose of the slots is to discharge the sloughed off slime into the trough 51 so that it can be scraped and discharged with the water to a subsequent settling tank. The cylinders 56 through 58 are mounted concentrically on a shaft 62 driven by a motor 63. The ends of the cylinders are supported on end brackets 64 and 65 respectively. Any number of concentric cylinders can be included in a bank, and the number of banks of cylinders will be governed by the amount of treatment required for a given reduction in B.O.D.

The influent to the assembly is introduced through an influent line 66 as a fairly uniform stream. The rotation of the shaft 62 together with the resultant rotation of the concentrically mounted cylinders 56 through 58 causes the waste material to come into intimate contact with the surfaces of the rotating cylinders. At the surfaces, the microorganisms absorb the sewage nutrients, forming a slime layer. Since only about half of the total area of the cylinders is in the liquid, the other half of each cylinder is being constantly exposed to air to maintain aerobic conditions. As in the case of the previous embodiment, additional aeration means such as perforated pipes can be provided if desired. Also, spiral scrapers can be mounted on the outside of the outer cylinder to sweep the settled and sloughed off materials toward the end of the trough 51 where it can be discharged with the water to subsequent stages.

The effluent of the unit passes to a collection box 68 by which it can be passed by means of a conduit 69 to a settling tank or the like, or the effluent can be recirculated for further treatment.

A pilot plant installation established the improved efficiencies possible with the apparatus of the present invention. Six rotating cylinders were employed, each 4 feet long, and having an area of five square meters. The rate of flow was 200 ml./minute at a substrate concentration of 500 mg./liter. The biological film was present in amounts of 2000 g./sq. meter. The substrate temperature was 20° C. The speed of rotation of the cylinders was 6 to 10 r.p.m. The settled effluent had an oxygen demand of 100 to 200 mg./liter. Efficiencies of up to 95% can be obtained by increasing the length of the cylinders.

From the foregoing, it will be understood that the biological reactors of the present invention provide for continuous treatment of waste materials without the necessity of providing elaborate distribution mechanisms or underdrain systems. Since the flow of the treating chamber is channel flow, there is no significant loss of head as occurs in the use of trickling filters or the like. There is no chance of ponding or clogging, thereby eliminating the filter fly problem. With adequate aeration and proper operation of the unit, no substantial odor problem will be presented. Since the media is rotating in a bath-like channel, all parts of the media are equally submerged in liquid, thus eliminating the unequal distribution of sewage over the media.

Furthermore, the maintenance problems are simplified since there are no distribution or collection systems to be clogged up, and high efficiency of performance can be obtained.

It will be evident that various modifications can be made to the described embodiments without departing from the scope of the present invention.

I claim as my invention:

1. The method of treatment of aqueous waste materials by a bio-oxidation which comprises continuously passing a stream of such waste material in a generally horizontal path, partially immersing a plurality of coaxial longitudinally slotted cylinders; therein having a colony of biologically oxidizing organisms at their surfaces with their axis parallel to the flow direction of said stream, and rotating said cylinders to thereby cyclically immerse said colony into said stream and expose it to the aerobic conditions of the ambient atmosphere to thereby biologically oxidize waste materials in said stream.

2. The method of claim 1 in which said air under pressure is bubbled through said stream during biological oxidation of said stream.

3. A biological reactor comprising a trough, means for flowing an aqueous waste material through said trough as a stream, a plurality of coaxially mounted cylinders mounted on said trough with their axis parallel to the direction of flow of said stream, each of said cylinders having at least one longitudinally extending slot therein, said cylinders being only partly immersed in said stream, the surfaces of said cylinders having biologically active microorganisms thereon capable of absorbing the nutrients from said waste material, and means for rotating said cylinders to thereby cause periodic aeration of said cylinder surfaces.

4. The reactor of claim 3 which also includes means in said trough for diffusing air into said stream in its passage through said trough.

References Cited

UNITED STATES PATENTS

| 1,811,181 | 6/1931 | Maltby | 210—17 X |
| 2,798,042 | 7/1957 | Cox | 210—17 X |

FOREIGN PATENTS

| 1,230,940 | 4/1960 | France. |

MORRIS O. WOLK, *Primary Examiner.*

MICHAEL E. ROGERS, *Examiner.*